Nov. 20, 1962 K. C. MAHOLM 3,064,287
VALVE SYSTEM FOR INFLATABLE SAFETY DEVICES
Filed May 1, 1959
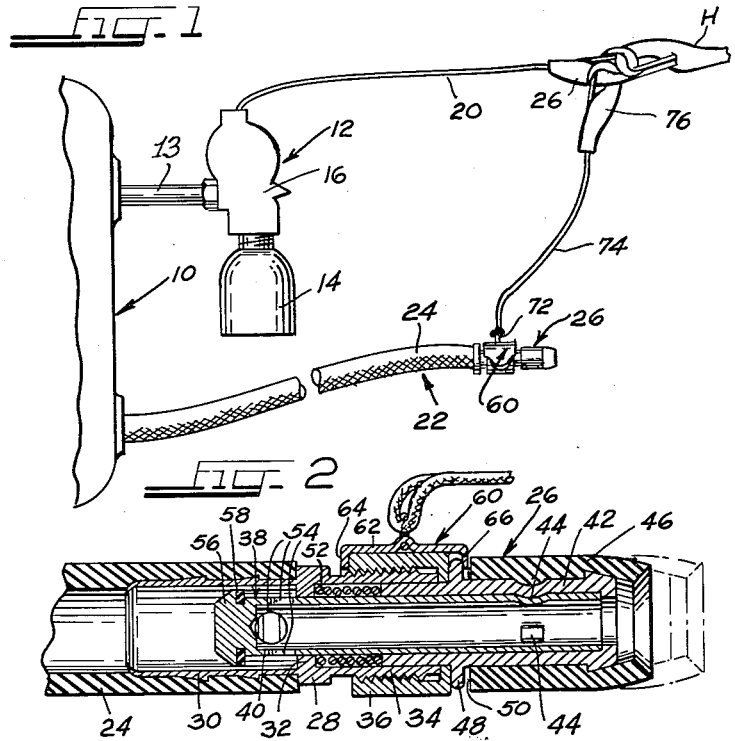
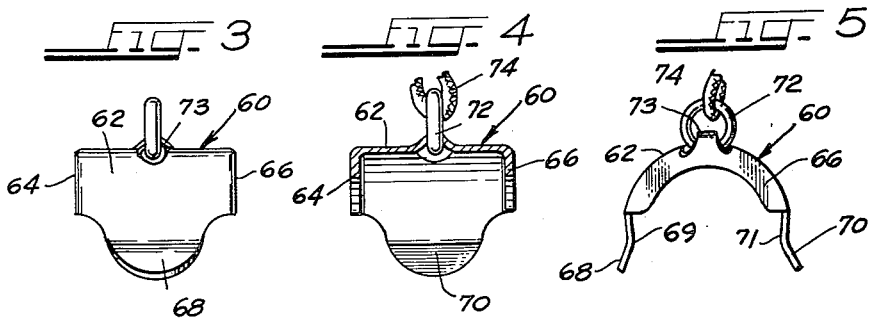
INVENTOR.
KENNETH C. MAHOLM
BY
Bair, Freeman & Molinare
ATTYS.

United States Patent Office 3,064,287
Patented Nov. 20, 1962

3,064,287
VALVE SYSTEM FOR INFLATABLE
SAFETY DEVICES
Kenneth C. Maholm, New Philadelphia, Ohio, assignor to Knapp-Monarch Company, St. Louis, Mo., a corporation of Delaware
Filed May 1, 1959, Ser. No. 810,280
3 Claims. (Cl. 9—319)

This invention relates to a valve system for an inflatable safety device and more particularly relates to an improved oral inflation valve therefor.

In inflatable safety devices such as life rafts and other flotation gear, the inflatable envelope is normally provided with means for introducing gas into the envelope. In some instances an oral inflation valve such as that disclosed in U.S. Patent No. 2,502,301 is provided. In other instances a compressed gas means is provided which includes one or more compressed gas cartridges and a manual control for effecting selective opening of the gas cartridges to effect release of the gas into the inflatable envelope. In still other instances, the safety device may include both a compressed gas means and an oral inflation means, the latter serving as an alternate, or supplemental means of inflating.

Now if such safety devices are being carried in high altitude aircraft, when the folded and stored envelope is exposed to low exterior-pressure conditions, whatever residual air or gas is contained in the envelope begins to expand and exert an inflation pressure on the envelope. This may cause the device to expand sufficiently to burst the straps which normally hold it in position in the aircraft, and the enlarging envelope may also interfere with control of the aircraft.

Thus, it is one object of this invention to provide means for bleeding residual gas from the envelope of the safety device at low exterior-pressure conditions.

Since the envelope-bleed must be closed off when it is desired to inflate the safety device, another object of this invention is to provide a valve system for an inflatable safety device which permits bleeding of residual gas from the envelope when the device is being stored and which automatically closes the bleed when the device is being inflated for use.

A further object of this invention is to provide an improved oral inflation valve of the type generally shown in U.S. Patent No. 2,502,301.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 illustrates a portion of an inflatable envelope of an inflatable safety device which is provided with inflating means for the envelope, including a compressed gsa inflator and an alternate oral inflating means, and which is provided with the improved control disclosed in this application;

FIGURE 2 is an enlarged longitudinal cross-section view of the oral inflation valve of FIGURE 1 equipped with the means for maintaining said valve in open-valve condition;

FIGURE 3 is a side elevation view of the clip for the oral inflation valve of FIGURE 2;

FIGURE 4 is a vertical cross-section view of the clip of FIGURE 3; and

FIGURE 5 is an end elevation view of the clip of FIGURE 3.

Referring now to the drawings, there is shown in FIGURE 1 a portion of the inflatable envelope of an inflatable safety device, to which envelope is connected a compressed gas cartridge means and an oral inflation valve. In FIGURE 1, the inflatable envelope is generally indicated at 10, and a compressed gas release means 12 is shown attached by conduit 13 to the inflatable envelope 10. The compressed gas means 12 includes an openable gas cartridge, or cylinder, 14 which is detachably connected to an opening mechanism 16 which is connected by conduit 13 to envelope 10, and the mechanism 16 itself includes gas passageway means therein through which the compressed gas passes from the gas cartridge 14 to the conduit 13 and to the interior of the envelope 10 when the mechanism 16 has been actuated to effect selective opening or piercing of the gas cartridge 14. The mechanism 16 is of a well-known type, such as that disclosed in U.S. Patent No. 2,865,225, and is adapted to be operated by a pull-cable-type actuator 20, so that when the pull cable 20 is pulled away from, and relative to, the mechanism 16, the cable actuates a cam means within the mechanism 16 to depress a valving pin within the mechanism 16 to open the gas cartridge 14. The mechanism is well known and forms no part of the invention, although the mechanism actuator 20, in combination with other elements hereinafter described, does operate in a novel way, as disclosed in this application for patent.

Also connected to the inflatable envelope 10 is an oral inflation means generally indicated at 22. The oral inflation means includes an elongated conduit 24 which opens to the interior of the inflatable envelope 10, and an oral inflation valve 26 connected to the extended end of conduit 24. The oral inflation valve 26 herein disclosed is generally of the type disclosed in U.S. Patent No. 2,502,301. The oral inflation valve 26 includes a hollow stem 28 which is provided with means 30 adapted for attachment to the conduit 24. The elongated tubular hollow stem 28 is formed with an internal shoulder 32 and with a threaded portion 34, which cooperates with an internally threaded and exteriorly knurled hand-grip, or nut 36. There is provided a tubular valve member 38 which is telescopically mounted in tubular stem 28. The tubular valve member 38 includes an inner tubular part 40 and an outer tubular part 42 secured to the inner tubular part by crimped wall portions 44. The outer tubular part 42 has a resilient annular mouthpiece 46 mounted thereon. There is formed on the outer tubular part 42 an annular flange 48 which is spaced from the mouthpiece 46 to define a recess 50 therebetween.

There is provided a spring 52 which surrounds the tubular part 40 and which is positioned between the edge of tubular part 42 and the shoulder 32, and said spring 52 tends to bias the tubular valve member 38 to the dashed-line position shown in FIGURE 2. The inner tubular part 40 is provided with apertures 54, and is formed with a head 56. A sealing member 58 is carried on tubular part 40 against head 56.

In normal operation, the valve member 38 is biased by spring 52 to the dashed-line position of FIGURE 2 wherein sealing member 58 abuts internal shoulder 32, thereby sealing off tubular valve member 38 from conduit 24. If it is desired to maintain the valve member closed, the hand-grip 36 is adjustable along the stem toward flange 48. With the nut 36 retracted, and by pressing against the mouthpiece 46, the valve member 38 moves to the full line position of FIGURE 2 and by blowing through mouthpiece 46, air passes through member 38, through apertures 54 and around member 58 to the interior of conduit 24 and to the appliance to which conduit 24 connects.

In the instant invention it is desired to hold the oral inflation valve 26 in a normally open condition. Toward that end, there is provided a sheet metal clip 60 which is shaped to define an arcuate body portion 62, and spaced arcuate inwardly extended flanges 64 and 66, and the central portion of the metal clip 60 is shaped to define a pair of diametrically disposed spring flanges 68 and 70 which bulge inwardly respectively at 69 and 71. A hook means including ring 72 is connected to an offset portion 73 of the arcuate body portion 62, and a pull cord 74 with selectively connecting hook 76 attached connects the ring 72 and clip 60 to the opening mechanism actuator 20.

When the oral inflation valve 26 is in the normally open condition as shown in full lines in FIGURE 2, and when the appliance to which the oral inflation valve connects is exposed to reduced atmospheric pressures such as when at high altitudes, then the valve 26 acts as a bleed valve to bleed off whatever residue gases have remained in the appliance in the packing process, and the open valve 26 thereby serves as a normally open relief valve to permit of the discharge of such residue gases from the interior of the appliance 10.

However, when it becomes necessary to utilize the appliance 10 in an emergency situation, it is essential that the normally open valve 26 be closed. Therefore, the clip 60 which normally maintains the valve 26 in open position is so constructed and arranged relative to the actuator 20 that when the actuator 20 is operated to effect opening of the cartridge 14, it operates simultaneously to remove the clip 60 from the valve 26 thereby effecting discharge of the compressed gas into the appliance 10 and simultaneously permitting closing of the valve 26 under the bias of spring 52, so that the appliance 10 will be properly inflated. Thereafter, if additional oral inflation is desired, the oral valve 26 may be operated in its normal and intended manner. If it is desired to prevent opening of valve 26, the nut 36 may be selectively advanced along stem 28 toward flange 48.

The clip 60 is of sufficient axial length so that the spaced flanges 64 and 66 encompass the nut 36 and the flange 48 when the parts are in adjacent position, as shown in FIGURE 2, and the arcuate length of the clip 60 is such as to position the inwardly bulged portions 69 and 71 to one side of the center of the oral valve 26, so that the clip 60 grips the oral valve 26 with sufficient force to prevent inadvertent withdrawal therefrom, but still the resiliency of the spring flanges 68 and 70 permits of the withdrawal of the clip 60 from the oral valve 26 simultaneously with the operation of the actuator 20. It is standard practice for the actuator 20 to be hooked to a stationary hook H which may be located in the aircraft so that upon movement of the appliance 10 away from the stationary hook H, the apparatus operates automatically to effect inflation of the appliance.

While there has been shown and described a particular embodiment of this invention, it will be obvious to those skilled in the art that various changes and modifications may be made therein without departing from the invention and, therefore, it is intended in the appended claims to cover all such changes and modifications as fall within the true spirit and scope of the invention.

What I claim as new, and desire to secure by Letters Patent of the United States, is:

1. An inflatable appliance comprising, in combination: an inflatable envelope; compressed gas means, including at least one compressed gas cartridge, attached to said envelope for selectively inflating said envelope with compressed gas, and a manual control for establishing a flow of gas from the gas cartridge to the inflatable envelope; an oral inflation valve attached to said envelope to provide alternate oral means for inflating the envelope, said oral inflation valve including spring means tending to bias said oral valve to a closed-valve condition; and clip means on said oral inflation valve for normally maintaining said oral valve in open-valve condition against the bias of said spring means, prior to establishment of flow of said compressed gas to said envelope, to permit bleeding of residual gas from the envelope at low exterior-pressure conditions.

2. An inflatable appliance comprising, in combination: an inflatable envelope; compressed gas means, including at least one compressed gas cartridge, attached to said envelope for selectively inflating said envelope with compressed gas, and a manual control for establishing a flow of gas from the gas cartridge to the inflatable envelope; an oral inflation valve attached to said envelope to provide alternate oral means for inflating the envelope, said oral inflation valve including spring means tending to bias said oral valve to a closed-valve condition; and means for normally maintaining said oral valve in open-valve condition against the bias of said spring means, prior to establishment of flow of said compressed gas to said envelope, to permit bleeding of residual gas from the envelope at low exterior-pressure conditions, said latter means including a clip, releasably carried by said oral valve, for keeping said oral valve in open-valve condition, and pull means connecting said clip to said manual control to provide for disconnection of said clip from said oral valve substantially simultaneously with piercing of the gas cartridge, whereupon said oral valve is automatically biased to a closed-valve condition when the envelope is inflated by the compressed gas.

3. An oral inflation device comprising, in combination: a hollow stem for attachment to an inflatable article, a sliding tubular valve telescopically mounted in the stem and having a head for closing the inner end of the stem and for engaging a valve seat in the stem, the valve being apertured adjacent the head, a mouthpiece on the outer end of the valve, a hand-grip on the stem, a spring surrounding the valve and tending to bias the head toward the valve seat and the mouthpiece away from the hand-grip, an outwardly extending flange on the valve, a clip of an axial size to embrace portions of both said hand-grip and said outwardly extending flange when they are positioned adjacent each other for maintaining said valve in an open-valve condition against the bias of said spring means, axially-spaced flanges on said clip for releasably engaging simultaneously the furthest spaced surfaces of said hand-grip and outwardly extending flange, and circumferentially disposed spring flanges on said clip for releasably connecting said clip to said stem; said clip being disconnected from said stem by being simply pulled radially outwardly thereof, and said hand-grip being selectively adjustable along the stem toward said outwardly extending flange, after the clip has been disconnected, to prevent movement of the mouthpiece and opening of the valve.

References Cited in the file of this patent

UNITED STATES PATENTS

| 2,502,301 | Alderfer | Mar. 28, 1950 |
| 2,531,952 | Smith | Nov. 28, 1950 |
| 2,571,532 | Briscoe | Oct. 16, 1951 |
| 2,774,979 | Moran | Dec. 25, 1956 |
| 2,865,225 | Huffman | Dec. 13, 1958 |

FOREIGN PATENTS

| 582,109 | Great Britain | Nov. 5, 1946 |
| 835,678 | France | Oct. 3, 1938 |
| 107,561 | Australia | May 26, 1939 |
| 55,045 | Holland | Aug. 16, 1943 |
| 995,728 | France | Aug. 22, 1951 |
| 1,173,966 | France | Nov. 3, 1958 |